United States Patent

Mallary

[11] Patent Number: 5,176,965
[45] Date of Patent: Jan. 5, 1993

[54] MAGNETIC MEDIUM FOR LONGITUDINAL RECORDING

[75] Inventor: Michael L. Mallary, Berlin, Mass.

[73] Assignee: Digital Equipment Corporation, Maynard, Mass.

[21] Appl. No.: 364,900

[22] Filed: Jun. 12, 1989

Related U.S. Application Data

[63] Continuation-in-part of Ser. No. 103,965, Oct. 5, 1987, abandoned.

[51] Int. Cl.[5] ............................................. G11B 23/00
[52] U.S. Cl. ...................................... 428/694; 428/65; 428/213; 428/336; 428/611; 428/900; 427/130; 427/131; 427/599; 360/110; 360/125
[58] Field of Search ............... 428/336, 213, 611, 694, 428/900, 65; 427/131, 48, 130; 360/110, 125

[56] References Cited

U.S. PATENT DOCUMENTS

| | | | |
|---|---|---|---|
| 3,393,982 | 7/1968 | Fisher et al. | 427/131 |
| 3,508,887 | 4/1970 | Chezel et al. | 428/610 |
| 4,287,544 | 9/1981 | Lazzari | 360/131 |
| 4,611,030 | 11/1986 | Uesaka et al. | 428/607 |
| 4,621,030 | 11/1986 | Uesaka et al. | 428/611 |
| 4,639,811 | 1/1987 | Diepers et al. | 360/125 |
| 4,656,546 | 4/1987 | Mallory | 360/110 |
| 4,672,493 | 6/1987 | Schewe et al. | 360/125 |
| 4,677,032 | 6/1987 | Robinson | 428/611 |
| 4,687,712 | 8/1987 | Sugita et al. | 428/611 |
| 4,696,831 | 9/1987 | Sakaguchi et al. | 427/48 |
| 4,729,805 | 3/1988 | Alexander et al. | 156/160 |
| 4,735,840 | 4/1988 | Hedgcoth | 428/900 |

FOREIGN PATENT DOCUMENTS

| | | |
|---|---|---|
| 0077069 | 4/1983 | European Pat. Off. |
| 0114076 | 7/1984 | European Pat. Off. |
| 0147126 | 7/1985 | European Pat. Off. |
| 0178685 | 4/1986 | European Pat. Off. |
| 59-72644 | 4/1984 | Japan |
| 60-52919 | 3/1985 | Japan |
| 61-177633 | 9/1986 | Japan |
| 8602732 | 6/1987 | PCT Int'l Appl. |
| WO89/03112 | 4/1989 | PCT Int'l Appl. |

OTHER PUBLICATIONS

T. N. Kennedy; Magnetic Recording Disk with Buried Servo Layer; Dec. 1980; (IBM Technical Disclosure Bulletin, vol. 23, No. 7A; pp. 2949-2950.

Bruyere; "A Coupling Phenomena Between The Magnetisation of Two Ferromagnetic Thin Films Separated by a Thin Metallic Film Application to Magnetic Memories."

Croll & Romankiw, Iron, Cobalt and Nickel Plating For Magnetic Applications, IBM Rel. SJ009, circa 1987.

*Primary Examiner*—Paul J. Thibodeau
*Assistant Examiner*—Leszek Kiliman
*Attorney, Agent, or Firm*—Fish & Richardson

[57] ABSTRACT

The magnetic medium includes a magnetic under image layer which may be separated from the hard magnetic recording layer by a nonmagnetic buffer layer. Virtual magnetic images induced in the magnetic image layer reduce off-track magnetization seen by the recording head. Thus, interference caused by tracks adjacent to the track being read is reduced.

29 Claims, 2 Drawing Sheets

MAGNETIC MEDIUM FOR LONGITUDINAL RECORDING

This application is a continuation-in-part of application U.S. Ser. No. 103,965, filed Oct. 5, 1987, now abandoned.

BACKGROUND OF THE INVENTION

This invention relates to a magnetic medium for longitudinal recording which suppresses off-track fringing signals.

As a recording head flies over a track of data, flux from this track and adjacent tracks is detected during a read operation. In many cases, adjacent tracks are separated by a wide enough intertrack space to make the flux reaching the head form an adjacent track insignificant compared to the flux from the track of interest. Adjacent track interference becomes more problematic when track density is high. In this latter case, the track adjacent to the track of interest is sufficiently close that its flux becomes significant.

SUMMARY OF THE INVENTION

According to one aspect of the invention a magnetic medium for longitudinal recording includes a magnetic image layer cooperating with a hard magnetic recording layer. The layers may be separated by a nonmagnetic buffer layer. The image layer may be an underlayer.

It is preferred that the magnetic thickness of the magnetic image layer be greater than the magnetic thickness of the hard magnetic recording layer. A suitable magnetic thickness for the magnetic image layer is approximately 30% thicker than the hard magnetic layer, where the magnetic thickness is equal to the product of the geometric thickness and the remanent magnetization. It is also preferred that the nonmagnetic layer thickness be in the range of 0.5 to 2 times the effective fly height of the magnetic head. In yet another aspect of the invention, the magnetic image layer has low permeability to avoid shorting out the head poles which reduces head efficiency. The image layer in this aspect may also have high coercivity.

In still another aspect of the invention the magnetic image layer has still lower permeability and higher coercivity so as to reduce the negative dip in the signal caused by the leading and trailing edges of the head.

In another aspect of the invention, the head generates magnetic fields during read to saturate the magnetic image layer in the medium so as to cancel the effect of the image charges below the head. This technique will allow the use of very thin buffer layers and will facilitate using a two-pole head to read.

A uniaxial anisotropy may be induced in a radial direction in the magnetic image layer of the medium of this invention. The uniaxial anisotropy may be induced by an applied magnetic field during deposition, by annealing the medium in a magnetic field after deposition, by controlling the angle of incidence during vacuum deposition, or by pretexturing the substrate on which the magnetic image layer is deposited.

DESCRIPTION OF THE PREFERRED EMBODIMENT

Figure 1:
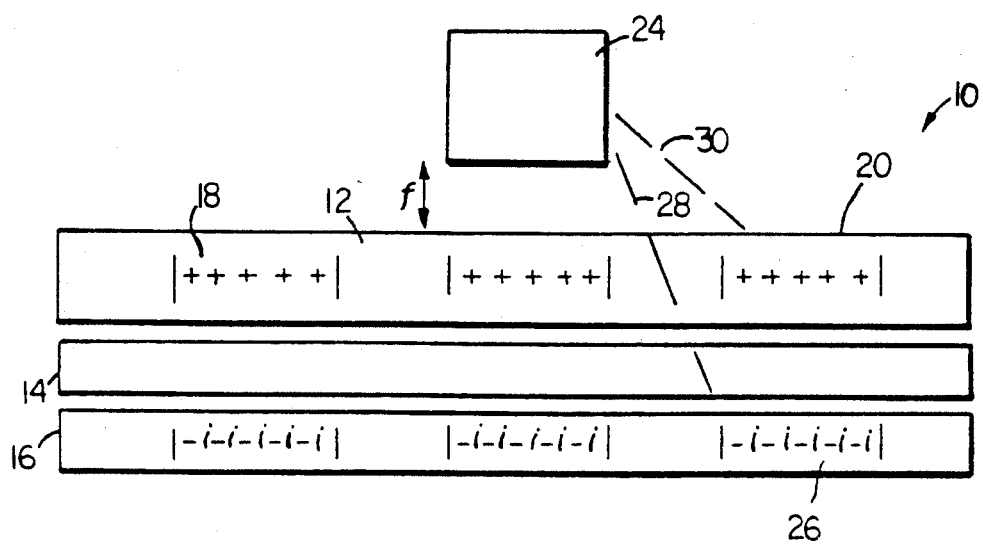

FIG. 1 of the drawing is a cross-sectional view of the magnetic medium, and a head thereover.

Figure 2:
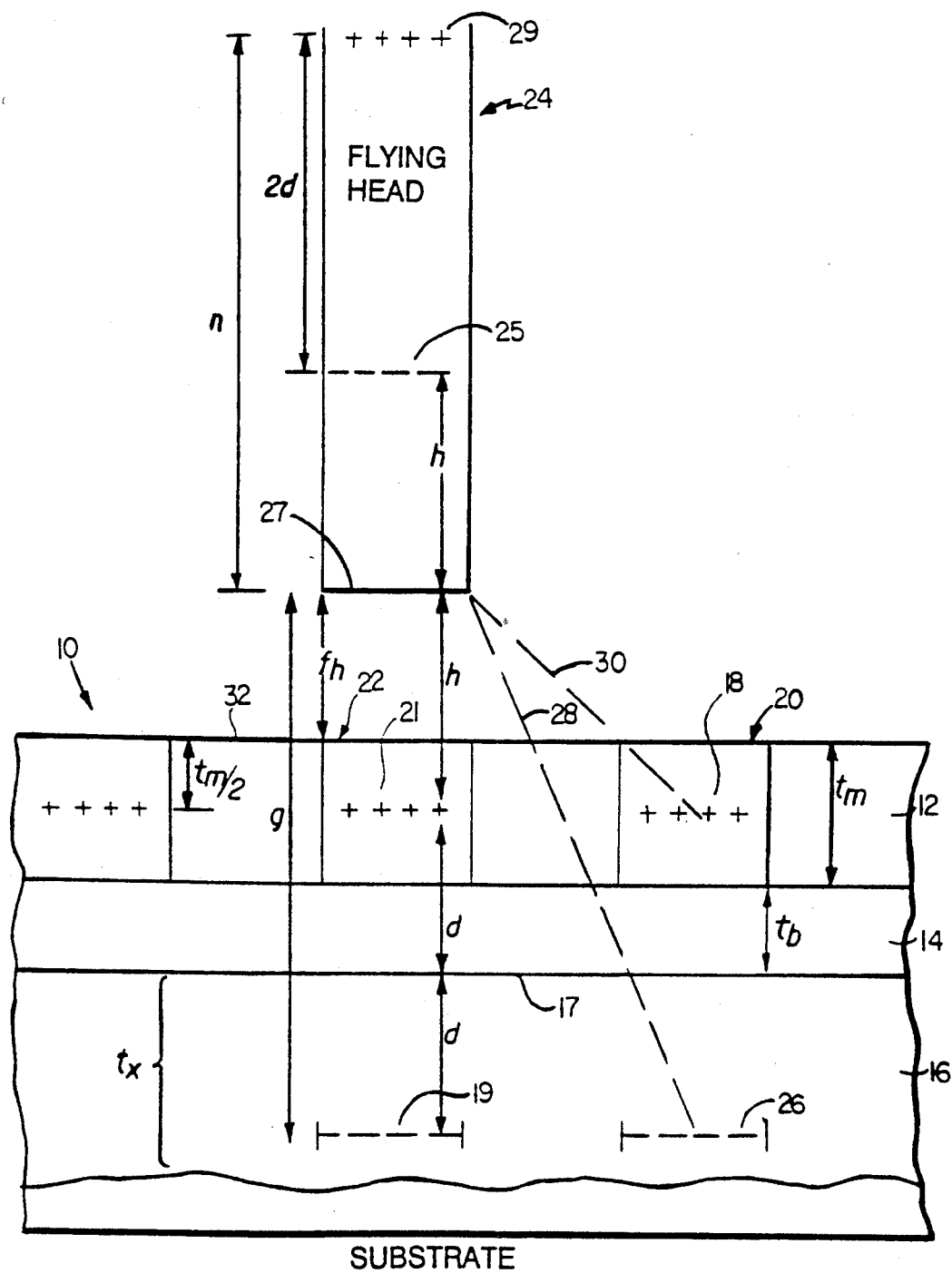

FIG. 2 is an expanded diagram of the embodiment shown in FIG. 1.

In narrow track, high density magnetic readback systems, it is desirable to reduce fringing from tracks adjacent to a track being read. As shown in FIGS. 1 and 2, this can be achieved in a magnetic medium 10 which includes a hard magnetic recording layer 12 of thickness ($t_m$), a nonmagnetic buffer layer 14 of thickness ($t_b$), and a magnetic image layer 16. To understand the effect of the magnetic image layer 16 of thickness ($t_x$), it is best to think in terms of the theory of virtual images. The magnetization of the hard magnetic layer 12 is treated as a series of discrete magnetic charges 18, 21 located at the center ($t_m/2$) from either surface of the hard magnetic layer 12. These "actual charges" 18, 21 (+) located in the hard magnetic layer 12 behave as if they induce negative image charges 19, 26 (−) within the magnetic image layer 16.

The magnetic image layer 16, located below the hard layer 12, is separated from the hard layer 12 by the nonmagnetic buffer layer 14. The distance from the actual charges 18, 21 to the surface 17 of the magnetic image layer 16 is (d) and is equal to ($t_m/2$) (the distance into the hard layer 12 at which the actual charges are located) plus ($t_b$) (the thickness of the nonmagnetic buffer layer 14). The presence of charges in the hard layer 12, distance (d) away from the surface 17 of the magnetic image layer 16, induces the opposite image charges at the same distance (d) from the surface 17 into the image layer 16.

In conjunction with a conventional medium, charges in a track 20 adjacent to a track 22 beneath a head 24 can interfere with the ability of the head 24 to read the track 22 information accurately. (The medium 10 is generally configured as a disk, and motion of the medium 10 is into or out of the plane of the figure.) As explained above, because of the magnetic image layer 16, charges in the hard magnetic layer 12 at the track 20 induce negative image charges 26 in the magnetic image layer 16. When the thicknesses of the layers 14 ($t_b$) and 16 are small, the distance from the negative image charges 26 related to track 20 to the head 24 is only slightly greater than the distance to the head 24 from the related charges 18 in the hard magnetic layer 12. These distances are illustrated by the dashed lines 28 and 30, respectively. Thus, the signal from the magnetic image layer 16 image charges 26 is almost as strong as that from the actual charges 18 in hard layer 12 but opposite in sign. The two signals nearly cancel any effect on the adjacent track 22 which is being read by the head 24.

When the head 24 is directly above the track 22 of interest, the situation becomes very complex. This is the case because the head is made from a soft, or low coercivity, magnetic material and will have image charges induced in it.

Assume that the head 24 flies above the surface 32 at an effective height (h) above the charges 21 in the hard magnetic layer 12. The presence of magnetic charges 21 in the hard magnetic layer 12 will induce almost equal and opposite image charges 25 in the head 24 at a distance (h) into the head 24 equal to the distance from the head surface 27 to the actual charges 21. Therefore, the image charges 25 in the head will be located at a distance (2h) from the actual charges 21.

Further, induced image charges 19 in the magnetic image layer 16 will induce a second set of image charges 29 in the head 24. This second set of head image charges 29 will be nearly equal to and opposite the image charges in the image layer 16, and located at a distance (n) into the head 24 from the surface 27 of the head 24 where (n) is equal to the distance (g) from surface 27 to the image charges in the magnetic image layer 16, where g=h+2d, from the surface 27 of the head 24. Induced virtual charges 25, 29 in the head 24 in turn induce further virtual charges in the magnetic image layer 16 but not shown.

Such inducing of image charges can go on indefinitely with each set of image charges inducing other image charges in its opposite magnetic material. The head thus sees an infinite series of repeating image charges similar in effect to the infinite series of images seen when one looks at the reflection of a mirror in another mirror. Although one would expect such an effect to result in cancellation of the signal from the track of interest, the applicant herein has determined this not to be the case. Analysis indicates only a weak suppression of the high frequency on-track signal (e.g., at 30 kfri, with an effective fly height of 10 microinches and a nonmagnetic buffer layer 14 thickness of 10 microinches, the loss of high frequency amplitude due to the buffer layer is about 12%).

The net effect of the new magnetic medium 10 is that off track interference is reduced while the signal from the track of interest is only slightly affected. The suppression of low frequency signals is much greater than that of high frequency signals, so the resolution (high frequency amplitude divided by low frequency amplitude) is also improved without resorting to electronic equalization which usually amplifies the noise as well.

The thickness of the nonmagnetic buffer layer 14 may range from zero to roughly the distance of closest approach of the head to an adjacent track. Optimum performance under ordinary conditions will be obtained if the thickness of the nonmagnetic buffer layer ranges from 0.5 to two times the effective fly height. As the nonmagnetic layer is made thinner, off-track signal suppression increases but on track high frequency amplitude decreases. An engineering tradeoff must be made between these two effects. The magnetic image layer 16 should be greater in magnetic thickness (geometric thickness×remanence) than that of the hard layer (e.g., 30% greater) so that it can absorb a substantial amount of the flux from the off-track signal without saturating. If it is made too thick, however, this layer suppresses the write process in proportion to its thickness.

When a two-pole head is used to read (a three pole head is preferred), two potential problems may arise. A first problem is that the pole corners will generate strong negative dips (e.g., 25% of the isolated signal for buffer thickness equal to effective fly height). This situation can be remedied either by electronic equalization or by beveling the pole corners so that the dips are softened. A second problem is that the magnetic image layer 16 may tend to short out the poles and reduce the head efficiency. To overcome this problem and reduce the negative dip problem, the permeability of the magnetic image layer 16 can be deliberately reduced. This will decrease the strength of the high order images but will also reduce the pole shorting effect.

The magnetic properties of the magnetic image layer can be varied to both meet the requirements of the recording head in order to reduce the off track fringing and to reduce the dip caused by the trailing edge of the head. Categorizing the combination of permeability ($\mu$) and coercivity ($H_c$) of the magnetic image layer with reference to the "hardness" of the hard recording layer allows the following chart to be created, where permeability ($\mu$) is equal to the ratio of the magnetic saturation field ($M_s$) to anistropy field ($H_k$), where $M_R$ is in Gauss, where $H_c$ is in Oersteds and where the values of $H_c$ in the case of a semi-hard magnetic image layer is deterninined by the formula:

$$t_m M_R/2\pi d > H_c > (t_m M_R/2\pi)((1/(2h+d))-(1/(2h+3d)))$$

Here it will be appreciated that a hard layer has a permeability of about 1 and a coercivity of 1200 or greater; a semi hard layer has a permeability of about 1 and a coercivity of between 64 and 500; a semi-soft layer has a permeability of about 20 and a coercivity of less than 2; and a soft layer has a permeability of about 1000 and a coercivity of less than 2.

| "hardness" | $\mu = M_s/H_k$ | Hc | Example |
| --- | --- | --- | --- |
| Hard layer | 1 | 1200 | $N_iC_oP_x$ where y<<x |
| Semihard image layer | 1 | 64<$H_c$<500 (See formula) | $N_iC_oP_y$ |
| Semisoft image layer | 20 | <2 | $N_iF_eC_o/N_iC_o$ |
| Soft image layer | 1000 | <2 | $N_iF_e$ |

As one moves down the chart, the effect of the image layer varies from cancelling all fringing but having a strong signal attenuation and inducing a strong negative trailing edge dip (in the case of a 2 pole head using a medium with a soft-magnetic image layer) to allowing some fringing to occur but reducing the signal attenuation and the negative trailing edge dip (in the case of semi-hard magnetic image layer with a 2 pole head). With a 3 pole head, the soft underlayer is preferred.

Finally, as another alternative, a weak magnetic field may be applied to the medium during a read, at a strength large enough to saturate the magnetic image layer and so to cancel the effect of the image charges below the head, but not strong enough to affect the hard magnetic recording layer. This technique would allow the use of very thin buffer layers and would also help with the problems associated with using a two-pole head to read.

The magnetic medium according to the invention is made by beginning with a polished Ni-P on aluminum standard substrate. A magnetic image layer such as NiFe is deposited on the substrate. As stated above, the thickness of the magnetic image layer should be approximately 30% greater than the hard magnetic layer to be deposited later. A uniaxial anisotropy is induced in a radial direction (the medium will normally be disc-shaped) in the magnetic image layer by applying a field during deposit, by performing an anneal in a magnetic field later, by controlling the angle of incidence in the case of vacuum deposition, or by pretexturing the substrate. If a soft magnetic image layer is desired then NiFe is deposited. If a semi-soft magnetic image layer is desired (for two-pole head operation) then a high Hk alloy such as NiFeCo, NiCo, or CoZr is used. Finally, if a semi-hard magnetic image layer is desired, an alloy such as NiCoP is deposited.

A nonmagnetic buffer layer (e.g., Ni-P for plating or Cr for sputtering) is next deposited. The thickness of this layer is in the range of 0.5 to two times the effective fly height. A hard longitudinal magnetic layer is then deposited by conventional means and finally an overcoat is deposited.

The magnetic medium of the present invention reduces fringing at high track density and improves resolution. When a three-pole head is used, the fringing may be so strongly suppressed that the bottom pole can be made significantly oversized. In this way the need for on wafer track trimming of the whole head is eliminated.

It is recognized that modifications and variations of the present invention will occur to those skilled in the art and it is intended that all such modifications and variations be included within the scope of the appended claims.

What is claimed is:

1. A magnetic recording medium comprising
   a first magnetic layer configured to record information in a longitudinal direction therein, and
   a second magnetic layer disposed adjacent to said first magnetic layer, said second magnetic layer being magnetically soft relative to said first magnetic layer and constructed so that all portions of said second layer disposed adjacent to a portion of said information recorded in said first layer remain unsaturated during reading of said portion of said information.

2. The medium of claim 1 further including a nonmagnetic layer disposed between said first magnetic layer and said second magnetic layer.

3. The medium of claim 1 wherein said second magnetic layer has a coercivity in the range of 64 to 500 and a permeability of approximately 1.

4. The medium of claim 2 wherein said medium is adapted for use with a magnetic head positioned at a predetermined effective fly height with respect to said medium, the nonmagnetic layer having a geometric thickness in the range of 0.5 to two times the effective fly height.

5. The medium of claims 1 or 2 wherein the second magnetic layer has low permeability with respect to a permeability of said first magnetic layer.

6. The medium of claim 2 wherein the nonmagnetic layer is NiP.

7. The medium of claim 1 or claim 2 wherein the second magnetic layer is NiFe.

8. The medium of claim 1 or claim 2 wherein the second magnetic layer is NiFeCo.

9. The medium of claim 1 or claim 2 wherein the second magnetic layer is NiCo.

10. The medium of claim 1 or claim 2 wherein the second magnetic layer is CoZr.

11. The medium of claim 2 wherein the nonmagnetic layer is Cr.

12. The medium of claim 1 or claim 2 wherein the second magnetic layer has a uniaxial anisotropy.

13. A magnetic recording medium comprising
    a first magnetic layer configured to record information in a longitudinal direction therein, and
    a second magnetic layer disposed adjacent to said first magnetic layer, said second magnetic layer being magnetically soft relative to said first magnetic layer and constructed to remain unsaturated during reading of said information from said first magnetic layer,
    wherein each one of said magnetic layers has a magnetic thickness equal to a product of a geometric thickness thereof and a remanence thereof, the magnetic thickness of said second magnetic layer being greater than the magnetic thickness of said first magnetic layer.

14. The medium of claim 13 wherein the magnetic thickness of said second magnetic layer is approximately 30% greater than that of said first magnetic layer.

15. A magnetic recording medium comprising
    a first magnetic layer configured to record information in a longitudinal direction therein,
    a second magnetic layer disposed adjacent to said first magnetic layer, said second magnetic layer being magnetically soft relative to said first magnetic layer and constructed to remain unsaturated during reading of said information from said first magnetic layer, and
    a nonmagnetic layer disposed between said first magnetic layer and said second magnetic layer,
    wherein each one of said magnetic layers has a magnetic thickness equal to a product of a geometric thickness thereof and a remanence thereof, the magnetic thickness of said second magnetic layer being greater than the magnetic thickness of said first magnetic layer.

16. The medium of claim 15 wherein the magnetic thickness of said second magnetic layer is approximately 30% greater than that of said first magnetic layer.

17. Magnetic medium for longitudinal recording in a system in which a head passes over the medium at an effective fly height during operation, said magnetic medium comprising:
    a first magnetic layer disposed adjacent to the head and configured to record information in a longitudinal direction therein;
    a nonmagnetic layer disposed beneath said first magnetic layer; and
    a second magnetic layer disposed beneath said nonmagnetic layer and being magnetically soft relative to said first magnetic layer.

18. The medium of claim 17 wherein said nonmagnetic layer has a geometric thickness in the range of 0.5–2 times the effective fly height.

19. A magnetic medium for longitudinal recording in a system in which a head passes over the medium at an effective fly height during operation, said magnetic medium comprising:
    a first magnetic layer disposed adjacent to the head and configured to record information in a longitudinal direction therein,
    a nonmagnetic layer disposed beneath said first magnetic layer, and
    a second magnetic layer disposed beneath said nonmagnetic layer and being magnetically soft relative to said first magnetic layer,
    wherein each one of said magnetic layers has a magnetic thickness equal to a product of a geometric thickness thereof and a remanence thereof, the magnetic thickness of said second magnetic layer being greater than that of said first magnetic layer.

20. The medium of claim 19 wherein said non-magnetic layer has a geometric thickness of about 10 microinches and the effective flying height is about 10 microinches.

21. Recording system comprising:
    a head adapted to pass over said medium at an effective fly height during operation;
    a magnetic recording medium comprising a first magnetic layer disposed adjacent to the head and configured to record information in a longitudinal direction therein;

a nonmagnetic layer disposed beneath said first magnetic layer; and a second magnetic layer disposed beneath said nonmagnetic layer and being magnetically soft relative to said first magnetic layer.

22. A magnetic recording medium comprising a first magnetic layer configured to record information in a longitudinal direction therein, a second magnetic layer disposed adjacent to said first magnetic layer, said second magnetic layer being magnetically soft relative to said first magnetic layer and constructed to remain unsaturated during reading of said information from said first magnetic layer, and a nonmagnetic layer disposed between said first magnetic layer and said second magnetic layer, wherein the second magnetic layer has a uniaxial anisotropy, said medium is configured as a disk, and the uniaxial anisotropy is in a radial direction.

23. The medium of claim 22 wherein said second magnetic layer has a permeability of about 1.

24. The medium of claim 22 wherein the second magnetic layer is NiCoP.

25. A magnetic recording medium comprising a first magnetic layer configured to record information in a longitudinal direction therein, a second magnetic layer disposed adjacent to said first magnetic layer, said second magnetic layer being magnetically soft relative to said first magnetic layer and constructed to remain unsaturated during reading of said information from said first magnetic layer, and a nonmagnetic layer disposed between said first magnetic layer and said second magnetic layer, wherein said first magnetic layer has a geometric thickness ($t_m$) and a magnetic remanence ($M_R$) and said second magnetic layer is semi-hard having a coercivity $H_c$ according to the relationship:

$$(t_m M_R / 2\pi d) > H_c > (t_m M_R / 2\pi)((1/(2h+d)) - (1/(2h+3d)))$$

wherein (h) is the effective flying height of a recording head over said medium and (d) is the geometric thickness of said nonmagnetic layer.

26. The medium of claim 25 wherein the coercivity $H_c$ ranges between approximately 64 oersteds and 500 oersteds.

27. A magnetic recording medium for longitudinal recording in a system in which a head passes over the medium during operation, comprising a first magnetic layer configured to record information in a longitudinal direction therein, a second magnetic layer that is magnetically soft relative to said first magnetic layer, and a nonmagnetic layer disposed between said first magnetic layer and said second magnetic layer.

28. A recording system comprising a magnetic recording medium, and a head for writing information to and reading information from said medium, said head being disposed to pass over said medium at an effective fly height during operation, said magnetic recording medium including a first magnetic layer disposed adjacent to the head and configured to record information in a longitudinal direction therein, and a second magnetic layer disposed beneath said first magnetic layer, said second magnetic layer being magnetically soft relative to said first magnetic layer and constructed so that all portions of said second layer disposed adjacent to a portion of said information recorded in said first layer remain unsaturated during reading of said portion of said information by said head.

29. The recording system of claim 28 further comprising a nonmagnetic layer disposed between said first magnetic layer and said second magnetic layer.

* * * * *